United States Patent
Alazraki et al.

(10) Patent No.: US 9,305,323 B2
(45) Date of Patent: Apr. 5, 2016

(54) COMMUNICATION SYSTEM FOR DETECTING LAW ENFORCEMENT VIOLATIONS IN A VEHICULAR ENVIRONMENT

(71) Applicant: MOTOROLA SOLUTIONS, INC., Schaumburg, IL (US)

(72) Inventors: Scott M Alazraki, Davie, FL (US); Alejandro G Blanco, Fort Lauderdale, FL (US); Patrick D Koskan, Lake Worth, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 165 days.

(21) Appl. No.: 14/042,100

(22) Filed: Sep. 30, 2013

(65) Prior Publication Data

US 2015/0095251 A1    Apr. 2, 2015

(51) Int. Cl.
G08B 21/00 (2006.01)
G06Q 50/26 (2012.01)
G06Q 10/00 (2012.01)

(52) U.S. Cl.
CPC .............. *G06Q 50/265* (2013.01); *G06Q 10/00* (2013.01); *G06Q 50/26* (2013.01)

(58) Field of Classification Search
CPC .................................................... B60Q 50/265
USPC ................. 340/425.5, 905, 933, 936, 937; 348/148, 149; 701/301
See application file for complete search history.

(56) References Cited

U.S. PATENT DOCUMENTS

| | | | |
|---|---|---|---|
| 6,289,332 B2 | 9/2001 | Menig et al. | |
| 6,690,294 B1* | 2/2004 | Zierden | 340/937 |
| 6,906,639 B2 | 6/2005 | Pedersen | |
| RE38,870 E | 11/2005 | Hall | |
| 7,394,355 B2 | 7/2008 | Sjonell | |
| 7,663,533 B2 | 2/2010 | Toennesen et al. | |
| 2002/0198641 A1 | 12/2002 | Halle | |
| 2007/0043502 A1 | 2/2007 | Mudalige et al. | |
| 2011/0001635 A1 | 1/2011 | Akens et al. | |
| 2012/0056735 A1 | 3/2012 | Stein et al. | |
| 2012/0286974 A1 | 11/2012 | Claussen et al. | |
| 2012/0306664 A1 | 12/2012 | Geter | |
| 2012/0326860 A1 | 12/2012 | Bantz et al. | |
| 2013/0049994 A1* | 2/2013 | Nicholson | 340/936 |

* cited by examiner

Primary Examiner — Jeffery Hofsass
(74) Attorney, Agent, or Firm — Barbara R. Doutre

(57) ABSTRACT

A communication system (200) comprises a radio communication device (100) comprising a controller (102) having law enforcement information (110) stored therein and a data acquisition device (108) for capturing area conditions surrounding a law enforcement vehicle or law enforcement personnel. The controller (102) detects violations of the law enforcement information based on variety of detection devices, such as video analytics. In response to a detection of a law violation by an offending vehicle, a transmitter (104) within communication device 100 generates an alert to similarly formed secondary devices (220) mounted and/or worn within the network. The system (200) provides an automated response through devices (220) by gathering additional data pertaining to the offending vehicle to detect for additional violations of the law, even across state lines. The system (200) may further facilitate apprehension of an offending vehicle through automated roadblocks.

19 Claims, 3 Drawing Sheets

COMMUNICATION SYSTEM FOR DETECTING LAW ENFORCEMENT VIOLATIONS IN A VEHICULAR ENVIRONMENT

FIELD OF THE INVENTION

The present invention generally relates to highway public safety and traffic monitoring communication systems.

BACKGROUND OF THE INVENTION

Public safety personnel, such as highway patrol officers, typically have jurisdiction over state routes (including freeways and expressways), U.S. Highways, Interstate Highways, and public roads. These officers are responsible for investigating and disposing of car accidents, disabled vehicles, debris, and other impediments to the free flow of traffic and are often the first responders at the scene of an accident (or obstruction), and in turn summon paramedics, firefighters, and tow truck drivers. While highway patrol officers tend to address issues related to transportation, they also typically possess full law enforcement authority and can enforce state laws anywhere in their state. These officers may also be assigned to drug task forces and other criminal investigative task force teams. These teams serve high-risk felony arrest and search warrants generated as a result of highway patrol investigations, and assist local, state, and federal law enforcement agencies. These officers may also provide narcotic patrol and explosive detection K-9 teams.

During a traffic stop, patrol officers have very little time to react to oncoming traffic, resulting in potentially dangerous situations. Move-over laws have been formed to help minimize the dangerous situation of a traffic stop by requiring motorists to change lanes or reduce speeds, typically 20 mph below the posted limit, as they approach traffic stops or emergency workers. However, public compliance with these laws has been limited. In addition to violations of the move-over laws, officers may need to address the law enforcement matters discussed previously. For example, officers on patrol may need to address firearms violations, open alcoholic container violations and/or missing person information. Early detection of such violations would be a highly desirable feature for law enforcement personnel. The ability to access and address law enforcement information would thus be of value in maintaining public safety on the road.

Accordingly, there is a need for an improved means of detecting law enforcement violations.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system for monitoring traffic to identify violations of law enforcement information. In accordance with the various embodiments, law enforcement information is pre-stored within one or more radio communication devices and may comprise traffic laws, such as move-over laws, speed limits, and other laws related to movement of the vehicle, and non-traffic laws, such as, firearms and alcohol container laws, most-wanted felons, persons of interest, missing persons information and stolen vehicle information. For the purposes of this application, the law enforcement information is detectable, for example through the use of video analytics, radar, infrared, sonar, and/or other detection systems. The system formed and operating in accordance with the various embodiments provides an alert in response to a violation of any one of the stored law enforcement information. The system advantageously avoids trying to capture and analyze all data on all vehicles and to focus on only those vehicles that have already been tagged as involved in a violation. Additional secondary communication devices can be used to track and monitor an offending vehicle, gathering additional information, even as the vehicle crosses state lines. The system can further provide an automated response to facilitate apprehending an offending vehicle.

Figure 1:
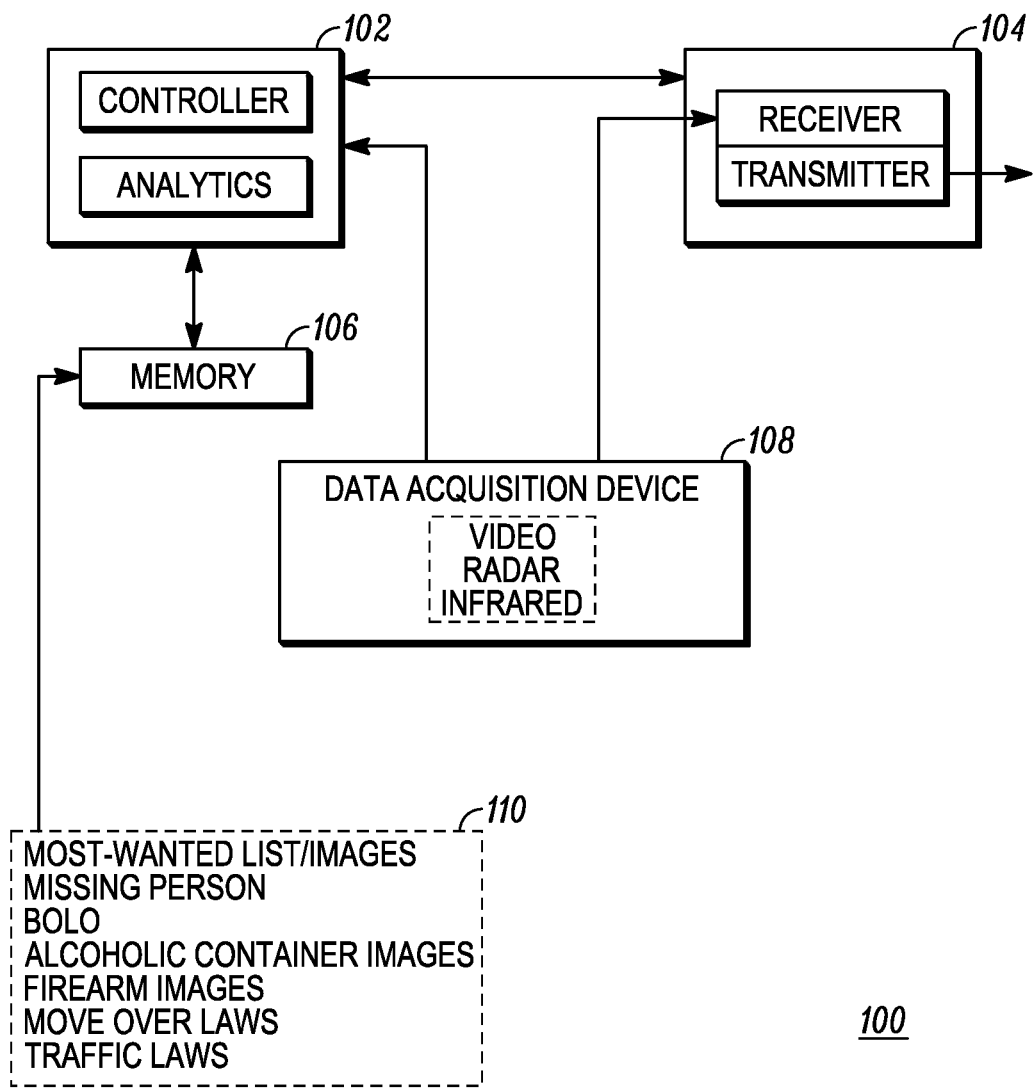
FIG. 1 is a block diagram of a radio communication device in accordance with the various embodiments of the invention.

FIG. 1 is a block diagram of a radio communication device 100 in accordance with the various embodiments of the invention. The communication device 100 may be mounted within a law enforcement vehicle or worn by an officer to communicate with other similarly formed secondary devices, as well as base stations, towers, dispatch centers, and control centers within a communication system. Communication device 100 comprises a controller 102, a transceiver 104, a memory 106, and a data acquisition device 108. In accordance with the various embodiments, the data acquisition device 108 detects traffic conditions surrounding the law enforcement vehicle. In accordance with the various embodiments, memory 106 has law enforcement information stored therein, including detectable traffic and non-traffic law enforcement information. Traffic information may comprise, but is not limited to, mover-over laws and speed-limits, while non-traffic law enforcement information may comprise firearm laws, alcoholic container laws, most-wanted persons, persons of interest All Points Bulletin (APB) and/or Be on the Lookout (BOLO), stolen vehicle and missing persons information to name a few. Examples of data acquisition device 108 may comprise video, radar, infrared, sonar, or/or other detection systems.

The controller 102, which is coupled to the memory 106 and the data acquisition device 108, analyzes the recorded traffic conditions to detect violations of the pre-stored law enforcement information. If the detected violation is indicative of an imminent or potential collision, the communication device 100 triggers a warning signal to oncoming traffic. This warning signal may be generated by for example, flashing lights on the law enforcement vehicle or other warning mechanisms mounted to the vehicle.

Figure 2:
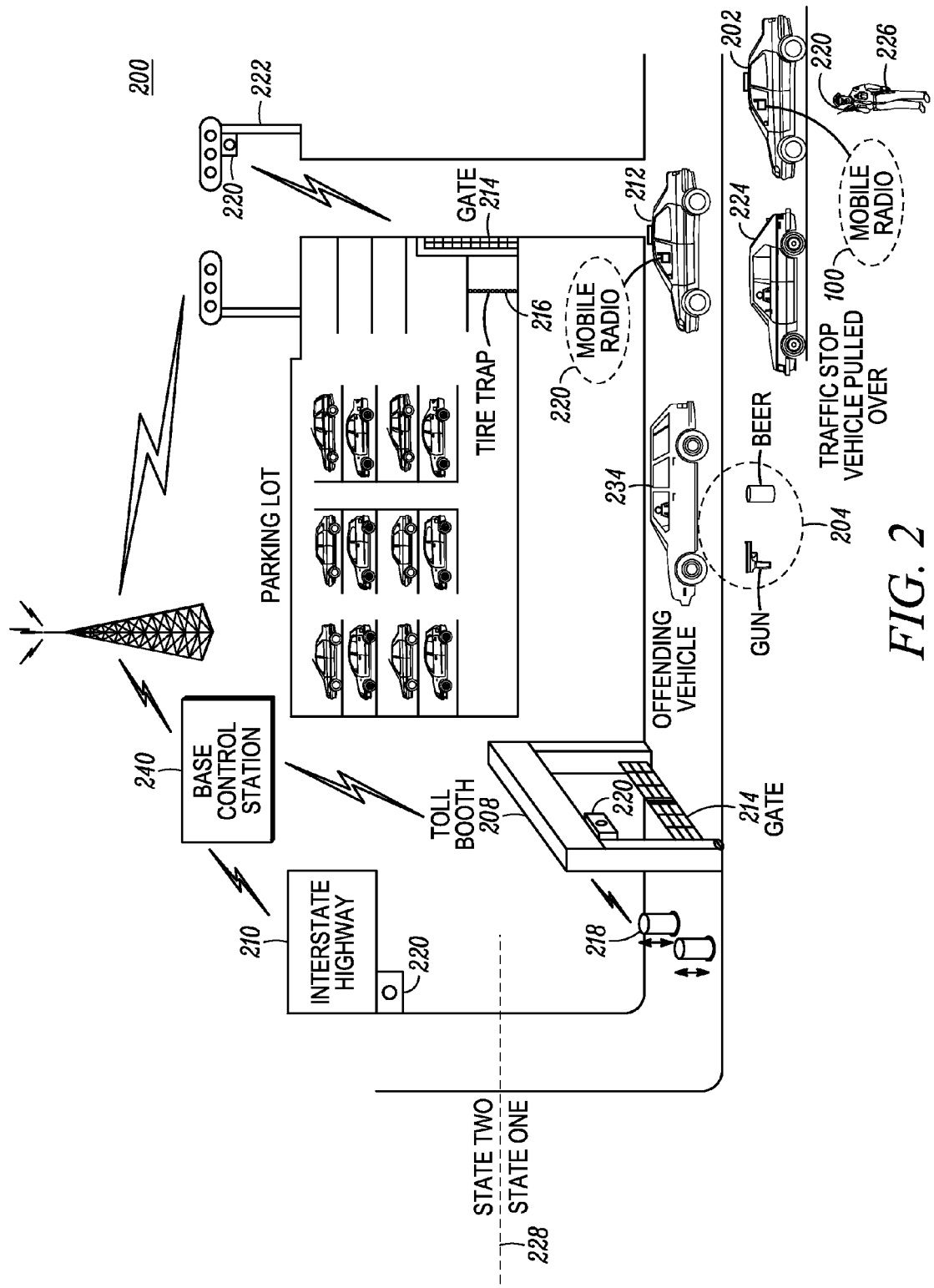
FIG. 2 is a communications system operating in accordance with the various embodiments.

Additionally, in response to the controller 102 detecting a violation of the law enforcement information, the transceiver 104 of communication device 100 transmits an alert signal to the other similarly formed secondary devices operating within the communication system. If the alert signal received by the secondary devices is indicative of an imminent collision, the secondary devices can further generate a warning signal to oncoming traffic. These secondary devices are shown in FIG. 2 as devices 220, but are formed similarly to the radio communication device 100 of FIG. 1. For example, the vehicular communication device 100 may communicate with other secondary devices 220 mounted to roadside devices to generate a warning signal, such as generating a message on a traffic sign, or by causing traffic lights to generate stop signals to help minimize the occurrence of additional accidents potentially arising through the imminent collision. Secondary devices which are worn by officers can also receive warning signals indicating an imminent collision and need to get out of harm's way.

If the alert signal received by the secondary devices from the primary communication device 100 is indicative of a non-traffic type law enforcement violation, such as missing person, firearm, open alcohol container, then the secondary devices begin tracking, monitoring and recording additional information pertaining to the offending vehicle's passengers and vehicle contents.

FIG. 2 depicts a communication system 200 formed and operating in accordance with the various embodiments. Law enforcement vehicle 202 contains a public safety vehicular radio communication device 100, formed as described in FIG. 1, and operating in accordance with the various embodiments. Law enforcement vehicle 202 is pulled over alongside the road with another vehicle 224 as part of a traffic stop, which may be for a violation or simply to provide aid to vehicle 224. As previously described, the radio communication device 100 comprises a controller having law enforcement information stored therein and video analytics for analyzing area conditions within and surrounding the law enforcement vehicle 202. The system 200 further comprises similarly formed secondary communication devices 220 which may be mounted upon roadside devices, such as traffic signals 222, signage 210, and toll booths 208 and/or mounted within other law enforcement vehicles, such as law enforcement vehicle 212, and/or worn by other law enforcement personnel 226.

In response to radio communication device 100 detecting a violation of the law by vehicle 234, communication device 100 transmits a warning signal to alert the secondary devices 220 that a violation of the law has occurred by, what will now be referred to as, an offending vehicle 234. In accordance with the various embodiments, the type of violation detected by radio communication device 100 enables the secondary devices 220 to generate warning signals to oncoming traffic and/or to monitor the offending vehicle for additional law enforcement violations and/or nearby officers 226, law enforcement vehicles, and/or command and control station 240 for potential action.

The offending vehicle 234 has violated one of the pre-stored law enforcement information stored within communication device 100 of law enforcement vehicle 202. In most cases the initial violation detected by communication device will be related to traffic, such as by speed limit violations detected surrounding the area around the law enforcement vehicle 202. As an example, the data acquisition device 108 of mobile radio 100 may comprise radar that detected that the violator did not slow down to a posted speed limit (or a specified amount below the posted speed limit as Move Over Laws specify). Other traffic related violations may be detected by video analytics, infrared, sonar, or/or other detection systems. For example, video analytics can detect that the violator did not move over a sufficient distance from the traffic stop. The combination of video analytics and radar together allows for detecting that a traffic violation has occurred.

Once the traffic violation has been detected by communication device 100, for example speeding by offending vehicle 234, the system of remaining secondary radios 220 are triggered to monitor additional traffic and non-traffic law enforcement information of the offending vehicle 234. Secondary communication devices can utilize video analytics to record and compare information pertaining to the contents of the offending vehicle 234 to detect violation of the pre-stored information, such as open alcoholic container law, firearm law, most-wanted list, or missing person. For example, the video analytics of one of the communication devices 220 can a detect beer container and/or firearm items 204. Additionally, a secondary device 220 mounted within another law enforcement vehicle, such as law enforcement vehicle 212, can receive the alert and enter into a pursuit of offending vehicle 234 while secondary device 220 gathers data pertaining to the offending vehicle.

In accordance with the various embodiments, the communication system 200 can further provide an automated roadblock response to stop the offending vehicle 234. As the pursuit progresses, the secondary communication devices 220 can enable an automated means of stopping the offending vehicle 234. The automated means of stopping the offending vehicle 234 may include but is not limited to gate closure 214, reverse-tire trap mechanism 216, and/or other automated road-block type devices 218.

Additionally, if the offending vehicle 234 moves across state lines 228, for example from the State of Florida to the State of Georgia, the law enforcement vehicle 212 can continue to follow the offending vehicle 234 while the memory of communication device 100 is updated with that current state's law enforcement information. This update capability allows law enforcement vehicles to cross state lines during a pursuit while maintaining updated information pertinent to that state. The updated law enforcement information can be downloaded by additional secondary communication devices 220, operating in the newly entered state. Assuming that the law enforcement vehicle 212 does not have jurisdiction in the new state, the violation(s) associated with the offending car law 234 can still be provided/passed on from law enforcement vehicle 212 to local in-state law enforcement so that they can take over the pursuit. Thus, the communication system 200 facilitates the ability for local law enforcement agencies to apprehend the offending vehicle 234 based on that state's own laws with proper jurisdiction.

As the pursuit progresses through the new state, the secondary communication devices 220 (associated with the new state's jurisdiction) can enable the automated means of stopping the offending vehicle, such as by gate closure 214, reverse-tire trap mechanism 216, or other automated road-block type devices 218. Here again, communication system 200 facilitates the ability of local law enforcement agencies to apprehend the offending vehicle 234 based on that state's own laws with proper jurisdiction.

Thus, when the system 200 determines that a law violation has occurred, the type of violation is determined and the secondary devices 220 can be alerted to begin either providing warning signals of an imminent collision and/or the secondary devices 220 can begin tracking and monitoring the offending vehicle 234. The system 200 advantageously avoids trying to capture and analyze data on all the vehicles on the road and allows the system to focus on only those vehicles, such as offending vehicle 234, that have already been tagged as involved in a violation—typically the initial violation being a traffic violation, such as violating move-over laws and/or speeding, and the subsequent detected violations being based on the more detailed contents of the vehicle. The stored law enforcement information pertaining to data and images pertaining to illegal firearms, alcoholic beverages, missing persons and most wanted persons allows the system to facilitate the pursuit and apprehension of an offending vehicle.

The data acquisition recorders within the secondary communication devices 220 capture one or more of the offender's image, license plate image, passenger image, and vehicle contents. The video analytics compare the offender's image with images of a most-wanted list stored in the controller. The video analytics may compare images of passengers to missing persons, persons of interest, most wanted person, firearms, and open alcoholic container images.

The communications system 200 may comprise a wide area network (WAN), personal area network (PAN), such as for areas surrounding the officer, vehicle area network (van), a dispatch communications network, an interconnect communications network, a public switched telephone network (PSTN), and the like. The communications network also may comprise a local area network (LAN), a metropolitan area network (MAN), a WiFi network, a Mesh network, a public safety network (e.g. Astro, TETRA, HPD, etc.) and/or any other networks or systems over which communication signals can be propagated. In that regard, the communications network 200 can include wired and/or wireless communication links. The communications network 200 can be configured to communicate data via IEEE 802 wireless communications, for example, 802.11 and 802.16 (WiMAX), 3G, 4G, EUTRAN, UMB, WPA, WPA2, GSM, TDMA, CDMA, WCDMA, OFDM, direct wireless communication, or any other communications format. Thus, the operating system for communications network 200 can be implemented in accordance with any suitable communications standards, protocols, and/or architectures, or a suitable combination of such standards, protocols, and/or architectures.

Figure 3:
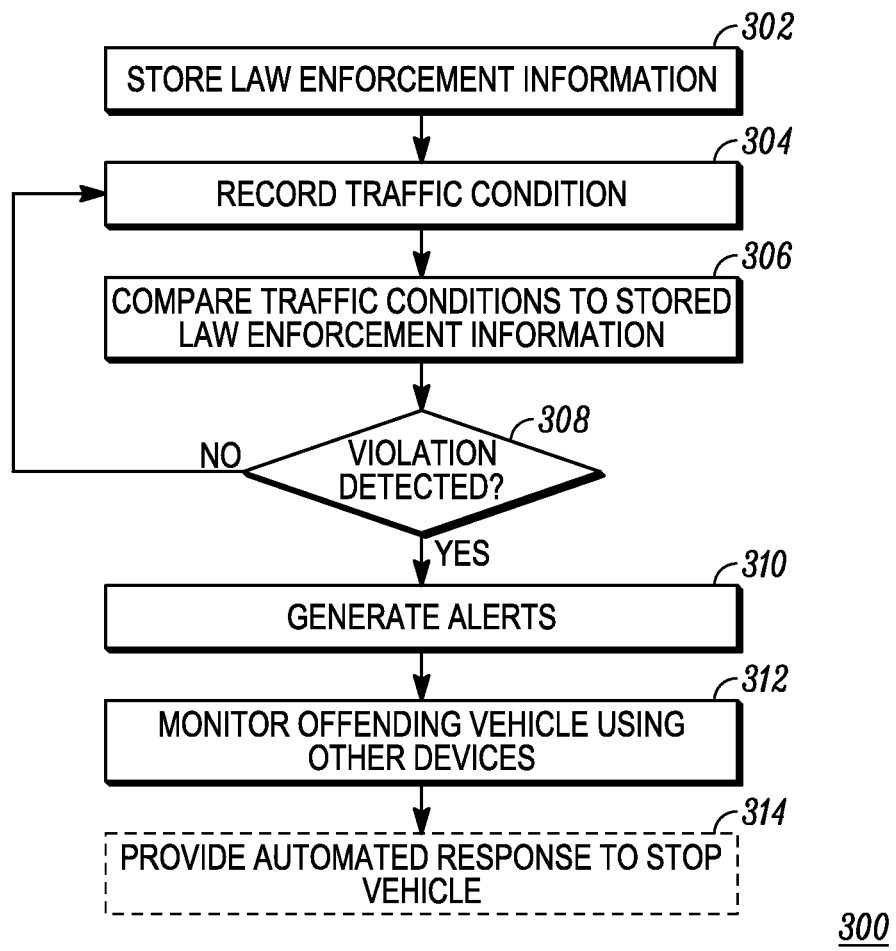
FIG. 3 is a flowchart of a method for detecting law enforcement violations in accordance with the various embodiments.

FIG. 3 is a flowchart of a method 300 for detecting a law enforcement violation in accordance with the various embodiments. In accordance with the various embodiments, step 302 begins by storing law enforcement information into a radio communication device, such as the radio communication device 100, operating in a vehicular environment. Traffic conditions are monitored and recorded at 304. At 306, the stored traffic conditions are compared to the stored law enforcement information. An automated violation detection is made at 308. If a violation is detected at 308, then alerts are generated at 310 and transmitted to secondary devices at 312. The secondary devices may be, as previously described, mounted to traffic apparatus, mounted in law enforcement vehicles and/or worn by law enforcement personnel. If no law enforcement violation is detected at 308 then the method returns to 304. Once the alerts are generated at 310, further monitoring of the offending vehicle is triggered at 312. For example, secondary devices 220 can capture images of the contents of the offending vehicle 234 as it moves along the road and utilize its video analytics to determine if additional law enforcement information has been violated, including non-traffic information, such as firearms, missing persons information, and most wanted persons information. An automated response can further be enabled to facilitate stopping the offending vehicle at 314. The automated response, such as automated road block, tire traps, or gate closure can be enabled by devices 220.

Accordingly, there has been provided a method and apparatus which stores law enforcement information and monitors traffic conditions surrounding a vehicular environment for violations of that law enforcement information. By comparing the current traffic condition to the stored law enforcement information, a law enforcement violation can be detected. In response to detecting a law enforcement violation relating to an imminent collision, a warning signal can be triggered at the vehicle as well as at nearby secondary devices mounted to roadside traffic apparatus and/or law enforcement vehicles, and/or worn by law enforcement personnel to warn oncoming traffic of an imminent collision. Once an offending vehicle has been identified by the primary communication device 100, then the secondary devices 220 can further monitor and track the offending vehicle. The recording of traffic conditions may include capturing images of the offending driver; and comparing the captured images to stored images of a most-wanted person list. The recording of traffic conditions may include capturing images of the offending driver's passenger; and comparing the captured images to stored images of a most-wanted person list. The law enforcement information can be updated automatically as state lines are crossed. The vehicle can continue to be monitored based on the updated state laws, facilitating that state's officers to continue the pursuit of the offending vehicle. Automated roadblock apparatus, under the control of local secondary devices 220, can be enabled to further facilitate the capturing of the offending vehicle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a communication system in a vehicular environment, comprising:
    storing law enforcement information in a communication device associated with a law enforcement vehicle;
    recording traffic conditions surrounding the law enforcement vehicle;
    comparing the traffic condition to the stored law enforcement information;
    detecting a traffic law violation as a result of the comparison;
    generating an alert signal indicating the detection of the traffic law violation by an offending vehicle to other communication devices; and
    generating a warning signal by the other communication devices indicating a potential collision, when the traffic law violation is a pre-stored move-over law violation; and
    tracking and gathering data pertaining to the offending vehicle using the other communication devices.

2. The method of claim 1, wherein the tracking and gathering further comprises:
    capturing images of the offending vehicle's driver; and
    comparing the captured images to stored images of a most-wanted person list.

3. The method of claim 1, wherein the tracking and gathering further comprises:
    capturing images of the offending vehicle's passenger; and
    comparing the captured images to stored images of a most-wanted person list.

4. The method of claim 1, wherein the tracking and gathering further comprises:
    capturing images of the offending vehicle's interior; and
    comparing the captured images to stored images of alcohol containers and firearms.

5. The method of claim 1, further comprising:
    updating the storing of law enforcement information as a vehicle passes over state lines, from a first state to a second state, with law enforcement information pertaining to the second state.

6. The method of claim 5, further comprising:
    notifying a law enforcement agency within the second state of the offending vehicle.

7. The method of claim 1, further comprising:
    enabling an automated road block in response to the detection of the traffic law violation.

8. The method of claim 1, further comprising:
    enabling traffic signals within a predetermined area to generate stop signals.

9. A communication system, comprising:
    a primary communication device operating in a vehicular environment, the primary communication device comprising:
        a data acquisition device for recording a traffic condition;
        a memory for storing law enforcement information;
        a controller coupled to the data acquisition device and the memory, the controller analyzing the recorded traffic conditions to detect violations of the law enforcement information; and
    wherein the law enforcement information comprises at least one non-posted, move-over law, and the primary communication device detects a violation of the at least one non-posted, move-over law by an offending vehicle and generates an alert signal to secondary communication devices in response thereto;
    the secondary communication devices generating a warning signal indicating a potential collision when the violation is a pre-stored, move-over law violation; and
    the secondary communication devices tracking and gathering both speed and non-speed data pertaining to the offending vehicle.

10. A communication system, comprising:
a primary communication device operating in a vehicular environment, the primary communication device comprising:
   a data acquisition device for recording a traffic condition;
   a memory for storing law enforcement information; and
   a controller coupled to the data acquisition device and the memory, the controller analyzing the recorded traffic conditions to detect violations of the law enforcement information; and
secondary communication devices coupled to road apparatus;
the primary communication device, in response to detecting violations of the law enforcement information by an offending vehicle, notifying the one or more secondary communication devices to monitor and gather data pertaining to the offending vehicle;
the secondary communication devices comparing the gathered data to a most-wanted persons list, missing persons list, alcohol container and firearms; and
at least one of the secondary devices generates an automated response to stop the offending vehicle, wherein the automated response to stop the offending vehicle comprises at least one of: automated gate closure, automated tire puncture apparatus, and automated roadblock apparatus.

11. A communication system, comprising:
a radio communication device coupled to a law enforcement vehicle, the radio communication device comprising:
   a controller having law enforcement information stored therein and video analytics for analyzing area conditions within and surrounding the vehicle, the controller for detecting violations of the law enforcement information based on the video analytics;
   a transmitter for generating an alert indicating that a violation of the law has occurred by an offending vehicle; and
      a plurality of secondary communication devices for receiving the alert signal of the violation of the law, the plurality of secondary communication devices tracking the offending vehicle and gathering video to compare the offending vehicle's content to pre-stored images associated with law enforcement.

12. The communication system of claim 11, wherein the pre-stored images comprise images of one or more of: most-wanted persons, missing persons, alcoholic container and firearms.

13. The communication system of claim 11, further comprising:
an automated road block device for stopping a vehicle in response to being enabled by one of the plurality of secondary communication devices.

14. The communication system of claim 13, wherein the automated response to stop a vehicle comprises at least one of: automated gate closure, automated tire trap apparatus, and automated roadblock apparatus.

15. A communication system, comprising:
a radio communication device coupled to a law enforcement vehicle, the radio communication device comprising:
   a controller having law enforcement information stored therein and video analytics for analyzing area conditions within and surrounding the vehicle, the controller for detecting violations of the law enforcement information based on the video analytics;
   a transmitter for generating an alert indicating that a violation of the law has occurred by an offending vehicle; and
   a plurality of secondary roadside communication devices for receiving the alert signal, and tracking and gathering data pertaining to the offending vehicle to compare to both traffic and non-traffic pre-stored laws.

16. A communication system, comprising:
a radio communication device coupled to a law enforcement vehicle, the radio communication device comprising:
   a controller having law enforcement information stored therein and video analytics for analyzing area conditions within and surrounding the vehicle, the controller for detecting violations of the law enforcement information based on the video analytics;
   a transmitter for generating an alert indicating that a violation of the law has occurred by an offending vehicle; and
   a secondary communication device mounted within another law enforcement vehicle the secondary communication device utilizing updated law enforcement information as the another law enforcement vehicle crosses state lines.

17. The communication system of claim 11, wherein violations of the law enforcement information detected by the radio communication device based on the video analytics comprise one or more of:
insufficient move-over distance from a traffic stop or speeding too fast past a traffic stop.

18. A communication system, comprising:
a primary communication device operating in a vehicular environment, the primary communication device comprising:
   a data acquisition device for recording a traffic condition;
   a memory for storing law enforcement information; and
   a controller coupled to the data acquisition device and the memory, the controller analyzing the recorded traffic conditions to detect violations of the law enforcement information, wherein the recorded traffic conditions comprise speed and non-speed traffic conditions; and
   the primary communication device generating a warning signal to oncoming traffic indicating a potential collision in response to the controller detecting a violation of the law enforcement information.

19. The communication system of claim 18, wherein the law enforcement information comprises at least one of:
a predetermined number of move-over lanes associated with a move-over law speed limit; and
a vehicular speed associated with a move-over law speed limit; and
wherein the predetermined number of move-over lanes and the move-over law speed limit is updated across state lines.

* * * * *